J. DE S. FREUND.
METHOD OF MAKING STRUCTURES OR ARTICLES FROM CEMENT OR CONCRETE.
APPLICATION FILED OCT. 10, 1910.

1,003,730. Patented Sept. 19, 1911.

UNITED STATES PATENT OFFICE.

JACOB DE S. FREUND, OF BEAVER, PENNSYLVANIA.

METHOD OF MAKING STRUCTURES OR ARTICLES FROM CEMENT OR CONCRETE.

1,003,730.

Specification of Letters Patent. Patented Sept. 19, 1911.

Application filed October 10, 1910. Serial No. 586,210.

*To all whom it may concern:*

Be it known that I, JACOB DE S. FREUND, a resident of Beaver, in the county of Beaver and State of Pennsylvania, have invented a new and useful Improvement in Methods of Making Structures or Articles from Cement or Concrete, of which the following is a full, clear, and exact description, reference being had to the accompanying drawings, forming part of this specification, in which—

Figure 1:
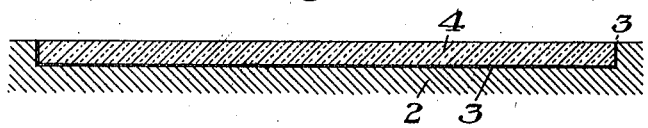
Figure 2:
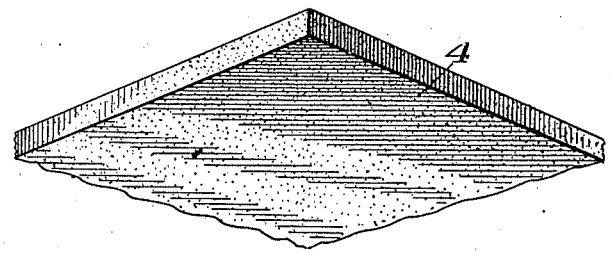
Figure 3:
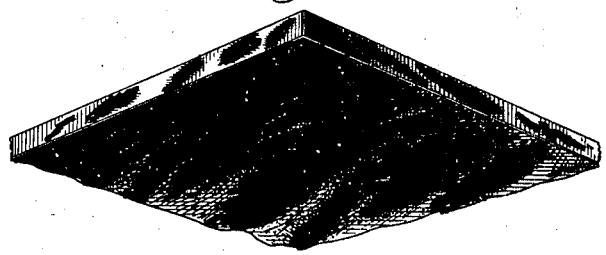

Figure 1 is a sectional view through one form of mold for manufacturing tiles, with the molded tile in place. Fig. 2 is a perspective view of a portion of a tile made by my improved method; and Fig. 3 is a perspective view of a tile made by the old method.

My invention relates to the method of manufacturing various articles from cement or concrete, which are formed in molds.

Heretofore in the manufacture of articles or structures from cement or concrete, the molds in which they were formed were first coated with oil before the batch from which the structure or article was made was placed in the mold, to prevent the formed article from sticking to the surface thereof. The surface of an article made by this method was coated with oil which marred its appearance, made it unsightly when placed in position, and made it hard to handle on account of its greasy surface. The surface of structures or articles made by this method would be covered with dust and dirt which would adhere to the oil on the surface thereof.

The object of my invention is to produce articles or structures which will be free from the above noted objections, and will have a dry surface clear of all blemishes, and my invention consists in applying to the forming surface of the mold a composition such as oil and soapstone, which will not only prevent the batch from sticking to such surfaces, but will adhere to the formed article and form thereon a permanent dry, smooth and water-proof coating, thereby obviating the necessity of painting the surface to exclude moisture.

The precise nature of my invention will be best understood by reference to the accompanying drawings, which will now be described, it being premised, however, that various changes may be made in the details of construction and general arrangement of the parts, without departing from the spirit and scope of my invention as defined in the appended claims.

Referring to the accompanying drawings, the numeral 2 designates a mold of any suitable shape, which has been washed or coated with oil and soapstone to form a film on the surface of the mold, as designated by the numeral 3.

4 is a finished article in the mold.

The coating may be applied in the form of a thin paste, or if desired, the mold may be washed with oil and afterward dusted with sufficient soapstone to absorb the oil. I place the batch of cement or concrete in the mold and press it therein by any well known forming device. After the article has been formed, it can readily be removed from the mold, the coating of oil and soapstone preventing the article from sticking to the mold surfaces. The oil acts as a binder for the soapstone, and the soapstone acts as an absorbent for the oil, so that when the formed article is removed from the mold, the surface thereof will be provided with a comparatively dry, white, and waterproof coating.

The advantages of my invention result from the described method whereby I produce structures or articles having a comparatively dry, white and waterproof coating.

I claim:—

1. The method of manufacturing cement or concrete shapes, consisting in applying to the mold surfaces an adherent transferable coating containing powdered water-resisting material and a liquid carrier, then forming the cement or concrete shape in said mold, thereby transferring a layer of said mold coating to the article to protect it, and then removing the article from the mold; substantially as described.

2. The method of manufacturing cement or concrete shapes, consisting in applying to mold surfaces an adherent transferable coating containing powdered soapstone and a liquid carrier, then forming the cement or concrete shape in said mold, thereby transferring a layer of said mold coating to the article to protect it, and then removing the article from the mold; substantially as described.

3. The method of manufacturing cement or concrete shapes, consisting in applying to the mold surfaces an adherent transferable coating containing powdered soapstone and an oil, then forming the cement or concrete shape in said mold, thereby transferring a layer of said mold coating to the article to protect it, and then removing the article from the mold; substantially as described.

In testimony whereof, I have hereunto set my hand.

J. DE S. FREUND.

Witnesses:
 JESSE B. HELLER,
 H. M. CORWIN.